(12) United States Patent
Hickman et al.

(10) Patent No.: US 6,523,130 B1
(45) Date of Patent: Feb. 18, 2003

(54) STORAGE SYSTEM HAVING ERROR DETECTION AND RECOVERY

(75) Inventors: Robert Chris Hickman, DuVall, WA (US); Marco A. DeMello, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/266,450

(22) Filed: Mar. 11, 1999

(51) Int. Cl.[7] .............................................. G06F 11/08
(52) U.S. Cl. ........................................................ 714/4
(58) Field of Search ............................... 714/4–6, 7, 11, 714/13, 17, 42, 43; 709/215, 223, 224; 707/202, 204

(56) References Cited

U.S. PATENT DOCUMENTS

| | | | | |
|---|---|---|---|---|
| 5,815,649 A | * | 9/1998 | Utter et al. ..................... | 714/6 |
| 5,828,847 A | * | 10/1998 | Gehr et al. .................. | 709/239 |
| 6,119,244 A | * | 9/2000 | Schoenthal et al. ............. | 714/4 |
| 6,145,094 A | * | 11/2000 | Shirriff et al. ................. | 714/11 |
| 6,163,855 A | * | 12/2000 | Shrivastava et al. ........... | 714/4 |
| 6,185,695 B1 | * | 2/2001 | Murphy et al. ................. | 714/4 |
| 6,202,067 B1 | * | 3/2001 | Blood et al. .................... | 707/10 |
| 6,219,801 B1 | * | 4/2001 | Yuge et al. .................... | 714/13 |
| 6,243,825 B1 | * | 6/2001 | Gamache et al. ............... | 714/4 |
| 6,249,879 B1 | * | 6/2001 | Walker et al. ................ | 714/11 |
| 6,266,781 B1 | * | 7/2001 | Chung et al. .................. | 714/4 |
| 6,272,648 B1 | * | 8/2001 | Findlay et al. ................. | 714/4 |
| 6,279,119 B1 | * | 8/2001 | Bissett et al. ................. | 714/12 |
| 6,292,905 B1 | * | 9/2001 | Wallach et al. ................ | 714/4 |
| 6,311,217 B1 | * | 10/2001 | Ehlinger et al. ............. | 709/225 |
| 6,393,466 B1 | * | 5/2002 | Hickman et al. ........... | 707/100 |

* cited by examiner

*Primary Examiner*—Scott Baderman
(74) *Attorney, Agent, or Firm*—Christensen O'Connor Johnson Kindness PLLC

(57) ABSTRACT

A massively scalable architecture for providing a self-monitoring and self-correcting storage system that is capable of handling hundreds of millions of users and tens of billions of files. The system includes one or more clusters storing data elements that are received from a plurality of clients. Each cluster comprises a plurality of storage servers. The storage system facilitates the addition of new storage servers, and the fast recovery of failed storage servers, by logging system transactions in multiple journals of different lengths. When a storage server fails, a cluster backup determines the time of failure and replays one of the journals in order to bring the failed storage server up to date.

13 Claims, 9 Drawing Sheets

STORAGE SYSTEM HAVING ERROR DETECTION AND RECOVERY

RELATED APPLICATIONS

This application is related to the co-assigned and co-filed U.S. Patent applications titled "Scalable Storage System" (U.S. patent application Ser. No. 09/266,458), "Extensible Storage System" (U.S. patent application Ser. No. 09/266,512 which is U.S. Pat. No. 6,393,466), and "Storage System Having Multi-Level Query Resolution Mechanism" (U.S. patent application Ser. No. 09/266,459), which are hereby incorporated by reference.

FIELD OF THE INVENTION

This invention relates generally to information systems and more particularly to a computing system having a self-monitoring and self-correcting architecture that is capable of storing information for millions of users.

COPYRIGHT NOTICE/PERMISSION

A portion of the disclosure of this patent document contains material that is subject to copyright protection. The copyright client has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

BACKGROUND

The Internet is a worldwide collection of networks that span over 100 countries and connect millions of computers. In 1997 traffic on the Internet doubled every 100 days. At the end of 1997, more than 100 million people were using the Internet. Reports indicate that the Internet is growing faster than all preceding information technologies including radio and television. The World Wide Web (WWW) is one of the fastest growing facets of the Internet and represents the computers that support the hypertext transfer protocol (HTTP) which is a common protocol for exchanging information.

Because there is no central authority controlling the WWW, finding useful information within the WWW can be a daunting task. In an effort to ease this burden, specialized web sites, known as "portals", seek to provide a single access point for users. Many of these portals implement software, referred to as robots or crawlers, that traverse the WWW in order to collect information and generate a searchable catalog. Thus, a key element to these systems is a massive storage system that holds the voluminous catalog. In addition, recent portals allow each user to customize the information, thereby further burdening the storage system with personalization data for millions of users. For these reasons, and for other reasons stated below which will become apparent to those skilled in the art upon reading and understanding the present specification, there is a need in the art for a scalable storage system that is capable of efficiently and reliably handling millions of accesses per day.

SUMMARY

A massively scalable architecture has been developed for providing a highly reliable storage system that is capable of handling hundreds of millions of users and tens of billions of files. The storage system includes a plurality of storage clusters, each storage cluster having one or more storage servers. Each client, such as a user, application, user group, community, etc., is assigned a unique partition within one of the storage clusters. Within each cluster, however, the data stored in each partition is replicated across multiple storage servers. Thus, the storage system can be easily scaled as the number of reads increases by adding individual storage servers to each storage cluster. In addition, the storage system easily scales to handle an increase in the number of writes, or as the number of files per cluster exceeds a predefined limit, by adding new storage clusters to the storage system. In this manner, the storage system provides redundancy for reads and writes, thereby achieving virtually no downtime when individual servers fail.

In one embodiment the storage clusters include a write master, a cluster backup and one or more storage servers. One storage cluster, such as storage cluster zero, further includes a partition master that maps individual clients into a unique partition that stores the particular information. One beneficial aspect of this technique is that the partition map isolates the clients from knowing where the data is located. Directory paths are generated directly from a partition ID and an element ID, thereby eliminating time consuming path lookups. In addition, partition IDs and element IDs are assigned so as to balance the directory structure.

Clients access the storage system through a plurality of web servers. In one embodiment, each web server executes Internet Information Server (IIS) on the Windows© NT operating system. Each web server has an application interface layer, such as Internet Server API, (ISAPI) that retrieves the client specific information from the storage servers.

According to one aspect, the storage system includes a storage manager for configuring and controlling the storage system. In another embodiment, the storage system includes a storage monitor that performs various checks on the partition master, the write master, the cluster backup and on each storage server. The storage monitor informs the storage manager when a failure is detected. In response to the failure message, the storage manager promotes one of the storage servers to perform the lost functionality. In this manner, the storage system self-corrects most failures without requiring administrator interaction.

According to another aspect, the storage system facilitates the addition of new storage servers, and the fast recovery of failed storage servers, by logging system transactions in multiple journals of different lengths. When a storage server fails, the cluster backup determines the time of failure and attempts to replay one of the journals in order to bring the failed storage server up to date.

DETAILED DESCRIPTION

In the following detailed description of exemplary embodiments of the invention, reference is made to the accompanying drawings that form a part hereof and, which show by way of illustration, specific exemplary embodiments in which the invention may be practiced. These embodiments are described in sufficient detail to enable those skilled in the art to practice the invention. It is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into three sections. The first section describes the hardware and the operating environment that is suitable for use as a server within the inventive storage system described below. The second section provides a detailed description of the inventive storage system and provides methods for operating an exemplary embodiment of the invention. Finally, the third section provides a conclusion of the detailed description.

Hardware and Operating Environment

Figure 1:
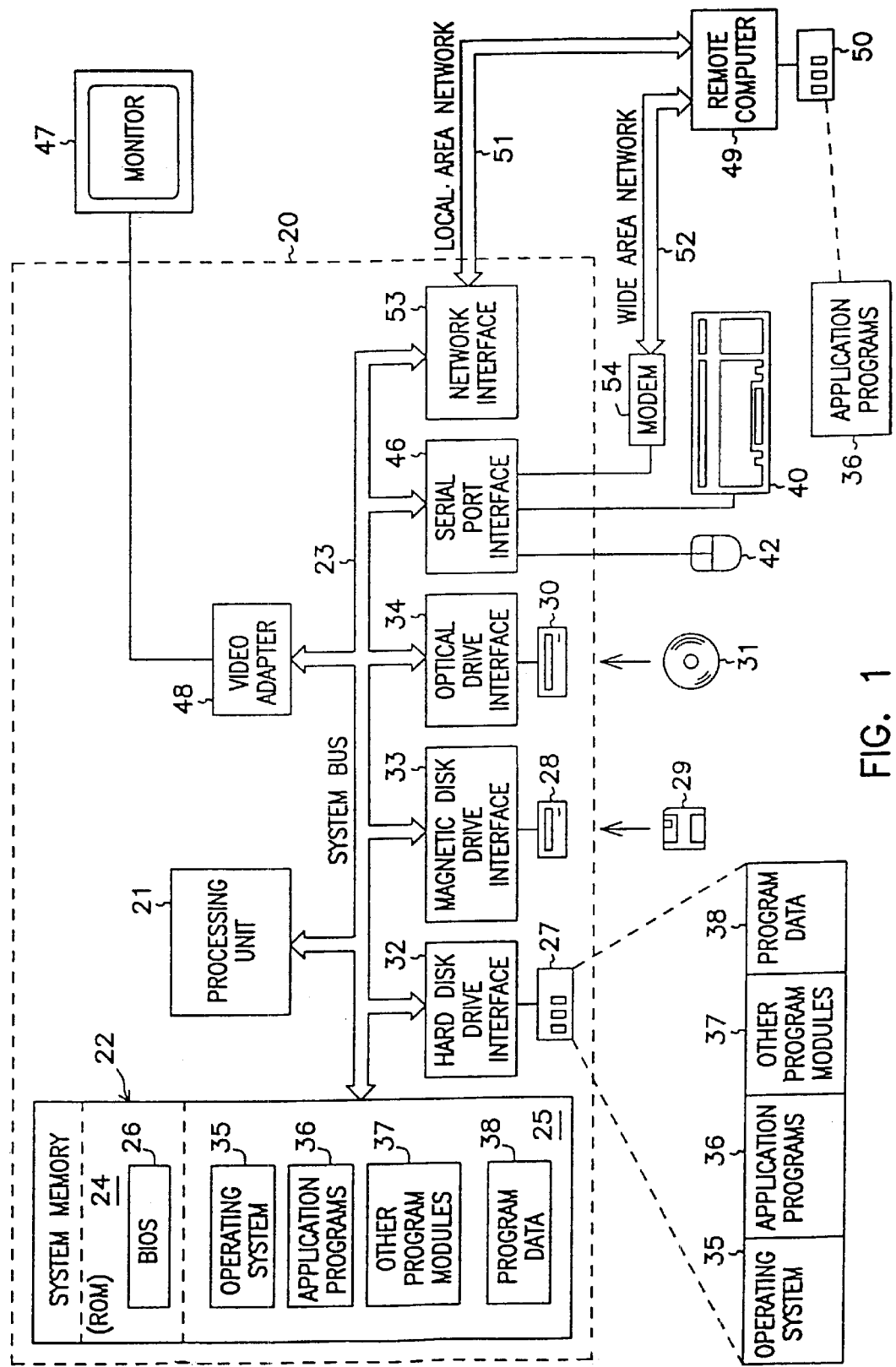
FIG. 1 is a diagram of the hardware and operating environment of a suitable computer in conjunction with which embodiments of the invention may be practiced.

FIG. 1 is a diagram of a computer suitable for operating as a server within various embodiments of the inventive storage system. The invention is described in the general context of computer-executable instructions, such as program modules, being executed by a computer, such as a personal computer. Generally, program modules include routines, programs, objects, components, data structures, etc., that perform particular tasks or implement particular abstract data types.

The exemplary hardware and operating environment of FIG. 1 includes a general purpose computing device in the form of a computer 20 having processing unit 21, system memory 22, and system bus 23 that operatively couples various system components including system memory 22 to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. Basic input/output system (BIOS) 26 contains routines that help to transfer information between elements within computer 20, such as during start-up, and is stored in ROM 24. Computer 20 further includes hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored by hard disk 27, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to processing unit 21 through serial port interface 46 that is coupled to the system bus, but may be connected by other interfaces, such as a parallel port, game port, or a universal serial bus (USB). Monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
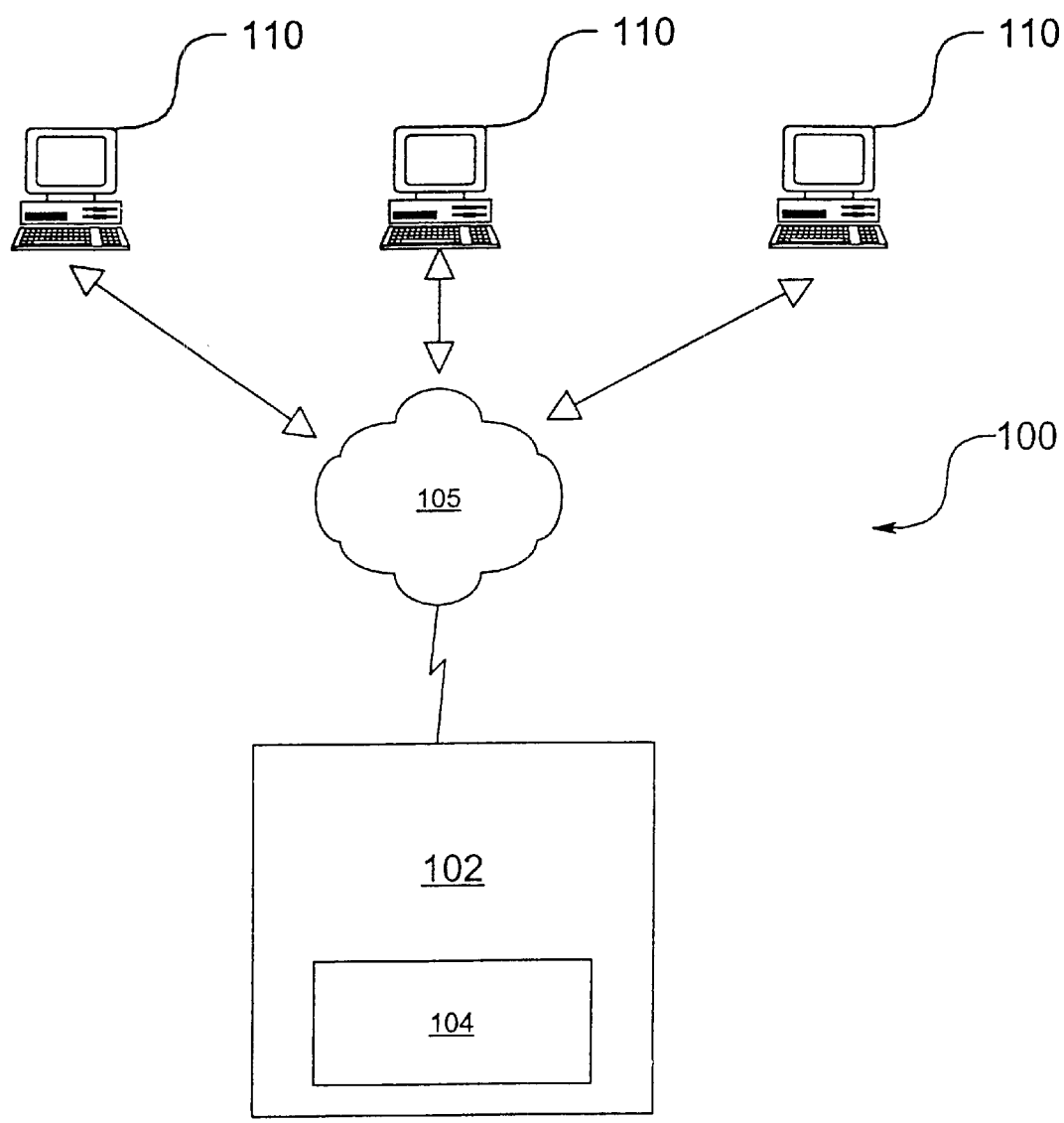
FIG. 2 is a block diagram illustrating a massively scalable storage system serving a plurality of Internet users.

FIG. 2 is a block diagram illustrating a computing environment 100 in which a computing system 102 includes massively scalable storage system 104 that is capable of handling hundreds of millions of users 110 and tens of billions of files. In order to access computing system 102, users 110 connect to Internet 105 via standard browsers such as Microsoft's Internet Explorer. Each user 110 controls the browser to establish a communication session with computing system 102. The browser issues a request specifying a WWW address for computing system 102 such as "home.microsoft.com." Upon establishing a communication session with one of the users 110, computing system 102 accesses storage system 104 and retrieves corresponding data for the user 110.

Figure 3:
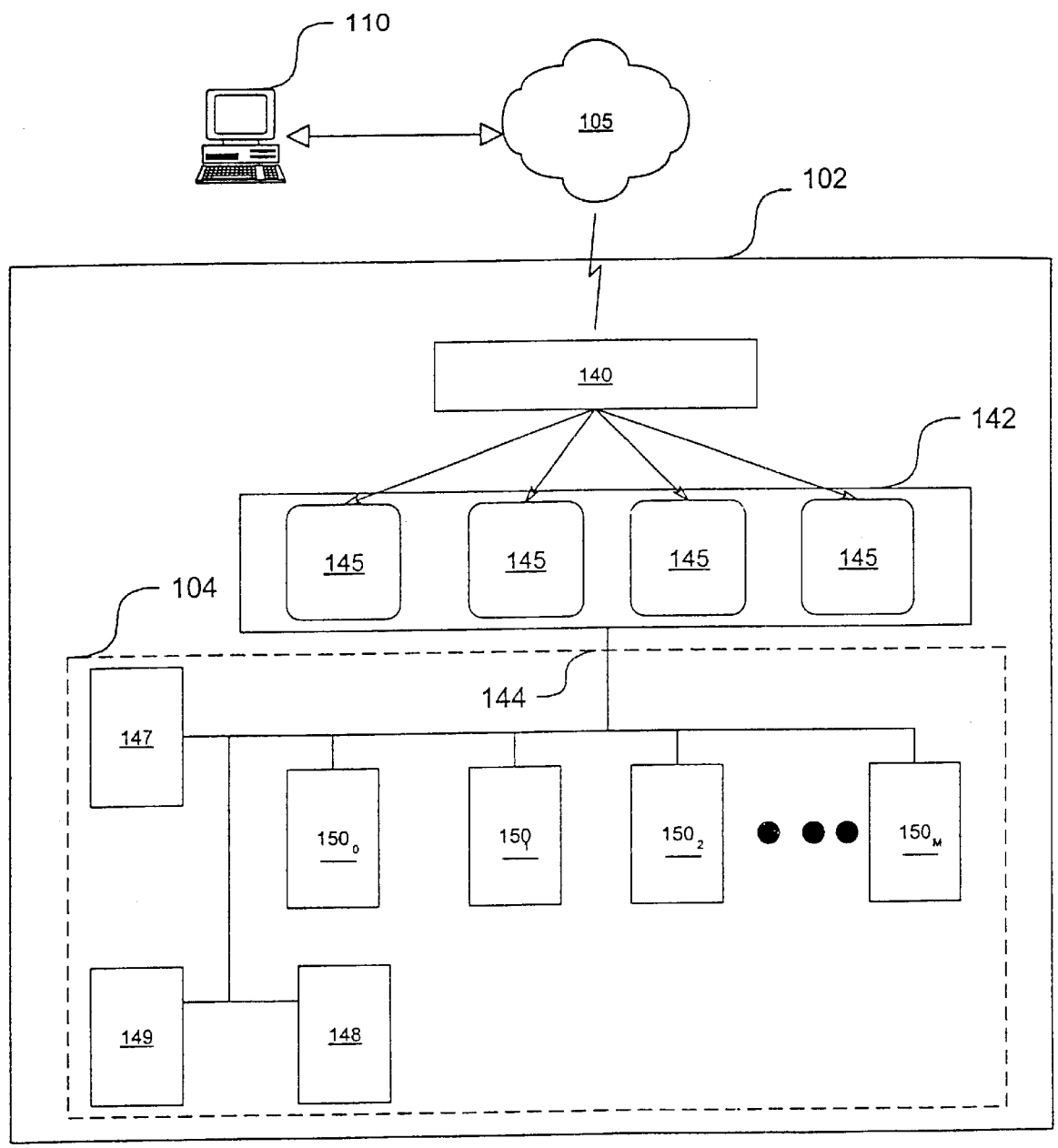
FIG. 3 is a block diagram illustrating one embodiment of the storage system of FIG. 2.

FIG. 3 is a block diagram illustrating one embodiment of computing system 102 that includes storage system 104 for handling millions of accesses via users 110 and for storing tens of billions of files. Connection manager 140 receives communication requests from user 110 and selects a web server 145 from web server cluster 142 to handle the communication session. Based on this selection, connection manager 140 translates the requested WWW address into a fixed Internet Protocol (IP) address for the selected web server 145. In this manner, computing system may easily be scaled to handle more Internet users 110 by adding web servers 145.

Upon establishing the communication session, the selected web server 145 accesses storage system 104 via network 144 and retrieves data that is specific to Internet user 110. As discussed in detail below, storage system 104 includes a plurality of storage clusters 150. For example, FIG. 3 illustrates storage system 104 having M+1 storage clusters 150. In order to retrieve the corresponding data, storage system 104 assigns each client, such as individual users 110, applications, communities, etc., a unique home directory within one of the storage clusters 150. This unique location is referred to hereafter as a "partition". Each partition contains one or more unique data elements and in one embodiment is a directory of files.

Each storage cluster 150 includes one or more storage servers. Data is replicated across each storage server within each storage cluster 150. In this manner, storage system 104 provides redundancy for reads and writes, thereby achieving virtually no downtime when individual storage servers fail. Furthermore, storage system 104 can be easily scaled to handle an increase in read requests by installing additional storage servers within each storage cluster 150. Storage system 104 can also easily scale to handle an increase in write requests by installing additional storage clusters 150. Similarly, as the number of files per storage cluster 150 exceeds a predefined limit, additional storage clusters 150 may be easily added to storage system 104 in order to add storage capacity.

In order to translate clients to a corresponding partition within storage clusters 150, storage system 104 maintains a partitioning logic, referred to as a partition map. In one embodiment, the partition map is stored at a predetermined partition on a predetermined storage cluster 150, such as partition zero of storage cluster $150_0$. One beneficial feature of this technique is that users 110 are isolated from knowing where their home directory is located. Furthermore, in one embodiment, storage system 104 automatically moves partitions from one storage cluster 150 to another in order to balance current loading conditions.

Figure 4:
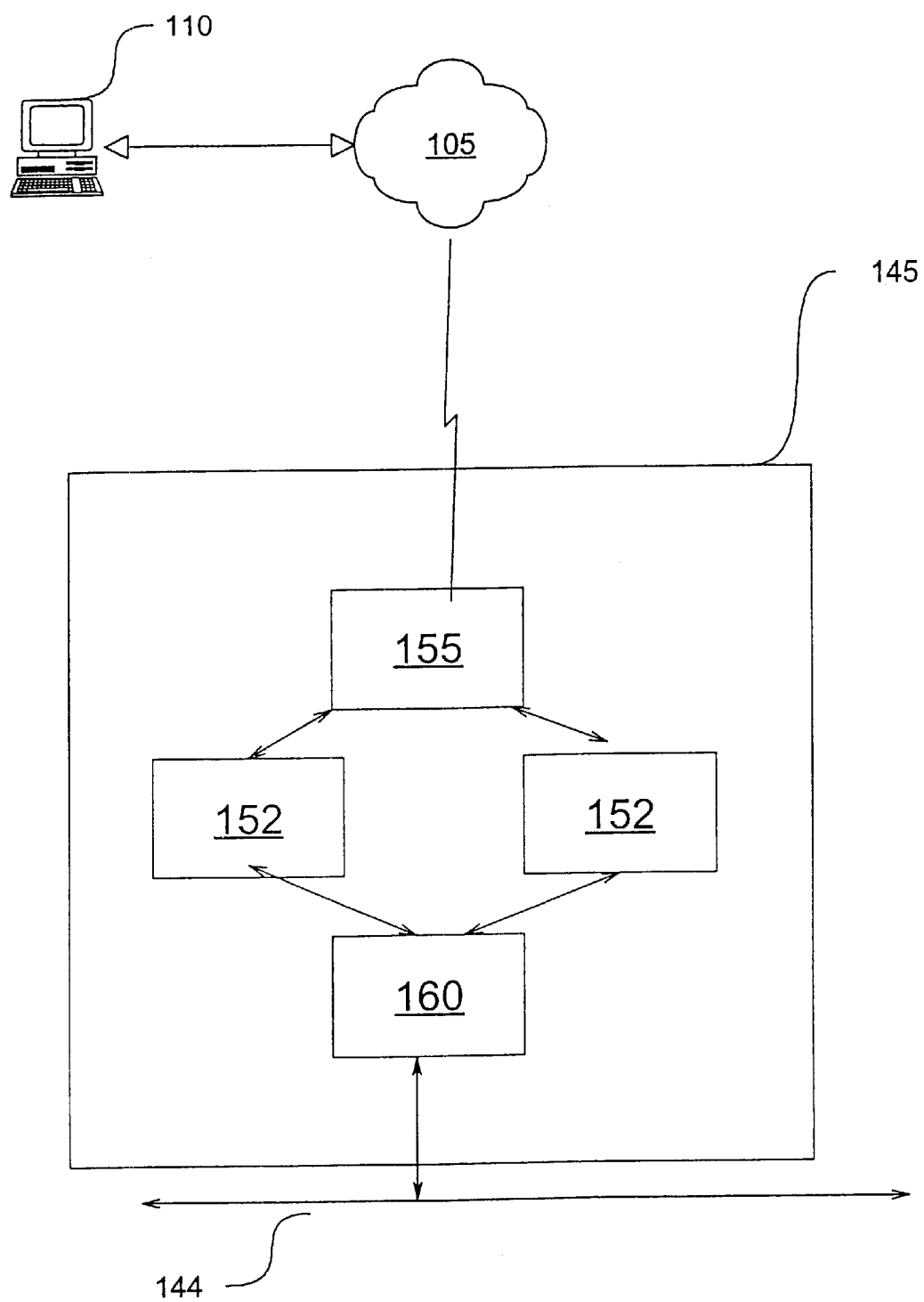
FIG. 4 is a block diagram illustrating one embodiment of a web server for interfacing with the storage system.

FIG. 4 is a block diagram illustrating one embodiment of a web server 145 operating according to the invention. Web server 145 includes web server software 155, one or more applications 152 and storage access module 160. In one embodiment, web server software 155 is Microsoft's Internet Information Server (IIS).

Applications 152 represent any suitable executable software module that communicates with users 110 via web server software 155. In one embodiment, applications 152 conform to the Microsoft Internet Application Programming Interface (ISAPI) and are implemented as ISAPI extensions. As ISAPI extensions, applications 152 are dynamic-link libraries (DLL's) that are invoked by web server software 155 at startup time.

These ISAPI applications extend the basic, underlying functionality of Microsoft's Internet Information Server (IIS) to deliver advanced Web-based Consumer Services. In one embodiment, this ISAPI Extension is an implementation of an HTML-based Message Board compatible with any available browser. In this embodiment, the Message Board ISAPI extension uses the services of storage system 104 through the interfaces exposed by access module 160 to render the Message Board User Interface, accept postings of messages, replies, file attachments, etc. All that content is then stored and retrieved from multiple partitions of the various storage clusters 150 within storage system 104.

Storage access module 160 controls all accesses to storage system 104. More specifically, storage access module 160 defines an application-programming interface (API) that allows applications 152 to transparently access storage system 104. Once a communication session is established between Internet user 110 and web server 145, storage access module 160 retrieves client-specific data from a corresponding partition located within storage system 104 via network 144. In one embodiment, storage access module 160 is also implemented as a dynamic-link library (DLL).

Figure 5:
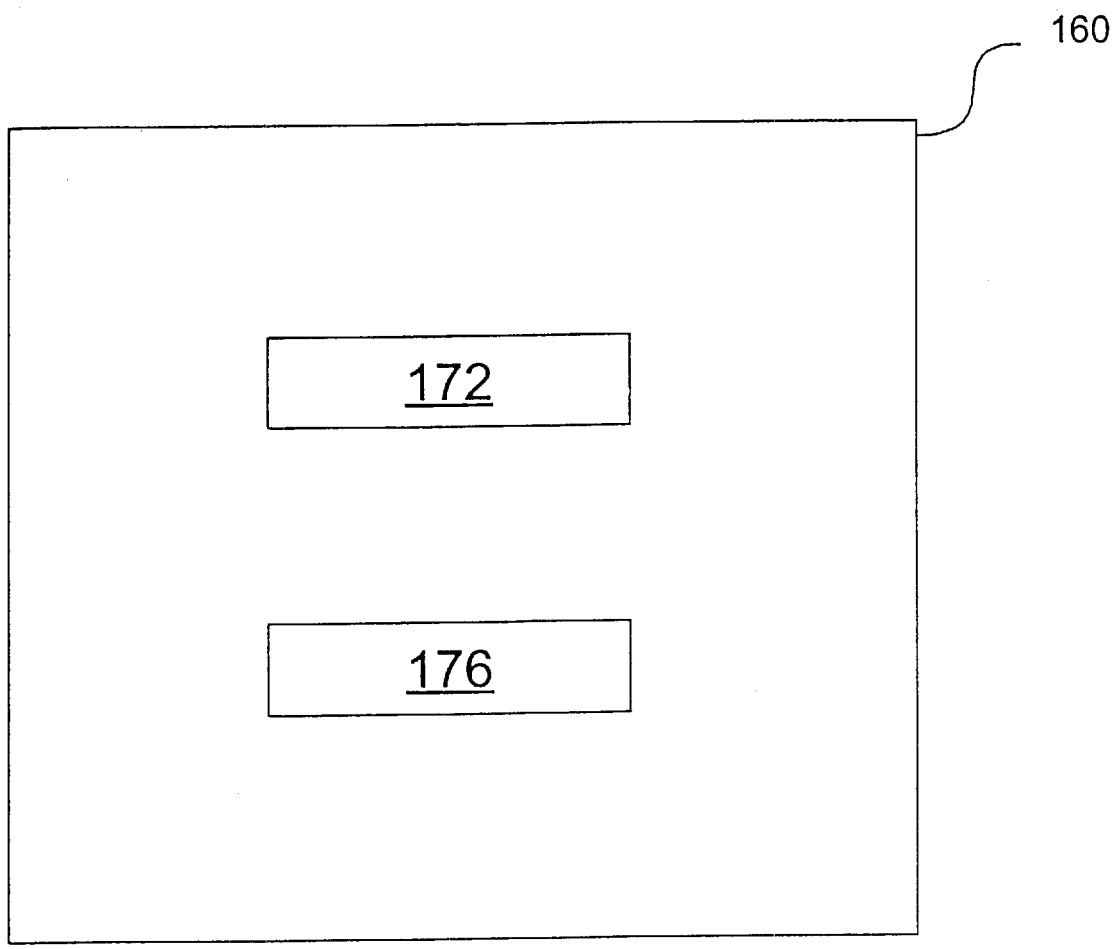
FIG. 5 is a block diagram illustrating one embodiment of a storage access software module executing on the web server of FIG. 4.

FIG. 5 illustrates one embodiment of storage access module 160 including partition map cache 172 and connection pool 176. In order to quickly respond to requests from applications 152, storage access module 160 maintains a cache of entries in partition map cache 172 of most recently accessed partitions. This Random Access Memory (RAM) based cache may vary from one web server 145 to another. Each entry includes a partition name, a partition ID, a write IP address for the storage cluster 150 that holds the partition and a list of IP addresses of storage servers within the cluster from which the requested data can be read.

When an access request is received from an application 152, storage access module 160 determines whether partition map cache 172 includes a corresponding entry for mapping the partition name to the appropriate partition ID. If so, storage access module 160 retrieves the stored IP addresses from cache 172 and directly issues the access request. If cache 172 does not contain an entry for the partition name, storage access module 160 requests that the storage cluster 150 maintaining the partition map, such as storage cluster $150_O$, translate the partition name into a corresponding partition ID. This data is then added by storage access module 160 to the local partition map cache 172.

As changes are made to the partition map via storage cluster $150_O$, a message is broadcast to each web server 145 and received by storage access module 160. When a change message is received, storage access module 160 makes the appropriate updates to partition map cache 172. This process of proactively updating the local partition map cache 172 on each web server 145 is aimed at keeping the number of roundtrips for partition lookups between web-servers 145 and the partition map stored in storage cluster $150_O$ to a minimum.

In order to access the storage clusters 150 of storage system 104, storage access module 160 maintains a connection pool between web servers 145 and the various storage servers of the many storage clusters 150 of storage system 104. This connection pool 176 consists of a pre-set number of persistent socket connections between servers of these various storage clusters 150. More connections are established by storage access module 160 as the need arises. The purpose of this connection pool is to reduce the overhead of setting up and tearing down socket connections between web servers 145 and storage clusters 150, which could amount to a significant degradation in performance to application services 152.

Figure 6:
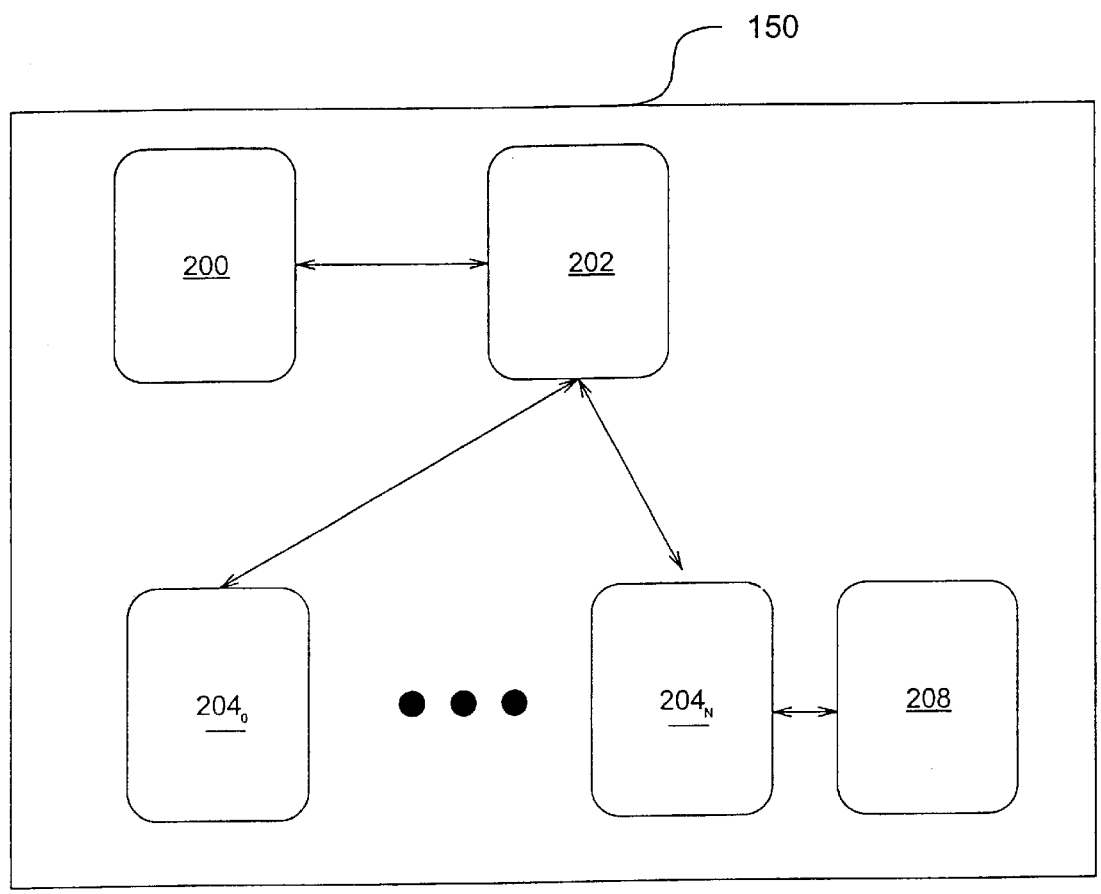
FIG. 6 is a block diagram illustrating one embodiment of a storage cluster including a partition master, a write master, one or more storage servers and a cluster backup.

FIG. 6 illustrates one embodiment of a storage cluster 150 that includes one or more storage servers 204, write master 202 and cluster backup 208. Storage cluster 150 may additionally include partition master 200 for maintaining the partition map for storage system 104. Partition master 200 updates the partition map based on all requests to create a new partition or to modify the data elements stored within an existing partition. For example, if an application 152 (FIG. 4) wishes to create a new partition entitled "my files", partition master 200 determines which storage cluster 150 is available to receive the new partition from a load balancing stand point and assigns the new partition a unique partition ID. As described in detail below, the partition master assigns partition Ids to balance the directory structure.

Figure 7:
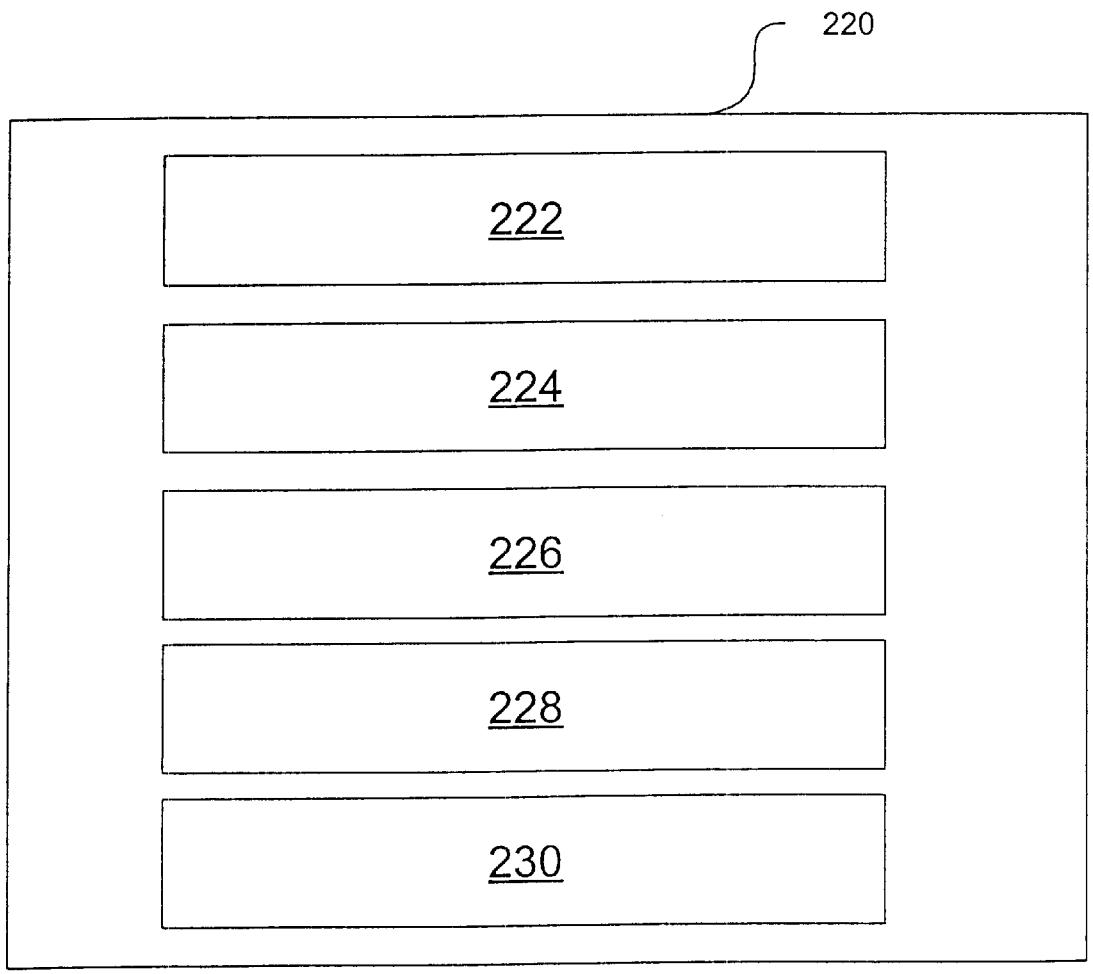
FIG. 7 is a block diagram illustrating a partition map having a plurality of tables for mapping partition names to appropriate locations within the storage clusters.

FIG. 7 illustrates one layout of a partition map 220 that comprises a plurality of tables including one or more partition name tables 222, one or more partition ID tables 224, application class table 226, client table 228 and cluster ID table 230. Each partition name table 222 maps a partition name, such as "my files," to a unique partition ID. Each partition ID table 224 maps each partition ID to a cluster ID that corresponds to one of the storage clusters 150 of FIG. 3. Application class table 226 stores names of classes of applications 152. For each application class, table 226 indicates a corresponding database server 149, a corresponding partition name table 222, and a corresponding partition ID table 224. Cluster ID table 230 lists write IP addresses and read IP addresses for the corresponding cluster server 150.

Referring again to FIG. 6, write master 202 of storage cluster 150 is responsible for handling all write requests directed toward storage cluster 150. For write requests, storage access module 160 retrieves a corresponding IP address for write master 202 from either the partition map cache 172 or from partition master 200. Next, storage access module 160 communicates the write request to write master 202.

Write master 202 parses the write requests into a plurality of data elements and assigns each new element a unique element ID. The data elements extracted from the write request contain both attributes and actual data. As described in detail below, directory paths are generated as a function of the partition ID and the element ID, thereby eliminating the need to invoke time consuming path lookups. Next, write master 202 simultaneously commands each storage server 204 and cluster backup 208 to store the elements including both the attributes and the actual data. In this manner each storage server 204 redundantly stores the elements. In this manner, storage cluster 150 can be easily scaled to handle an increase in the number of reads by adding storage servers 204 to each storage cluster 150.

In order to read data from storage cluster 150, storage access module 160 retrieves an IP for one of the storage servers 204 from either the partition map cache 172 or from partition master 200. In one embodiment, the IP address of one of the storage servers 204 is selected in a round-robin fashion. Additionally, the IP address may be selected based on current load conditions. Storage access module 160 will then use one of the pre-established socket connections from connection pool 176 to communicate with the selected storage server 204 and retrieve the data elements requested.

Each storage server 205 maintains one or more indexes for responding to simple read requests such as retrieving a designated element. In one embodiment, however, storage system 104 includes database cluster 149 that includes one or more database servers, each database server redundantly executing a database such as Microsoft SQL Server. In this embodiment, database cluster 149 is responsible for handling complex queries. In one configuration, storage system 104 includes a database cluster 149 for each class of applications 152. During a write request, write master 202 communicates a set of the extracted attributes to database cluster 149 as well as the partition ID. In this manner, database cluster 149 is able to perform sophisticated queries regarding the data elements stored in storage clusters 150.

According to one feature, storage system 104 is an extensible file store such that each element has a corresponding schema object. The schema object is used to parse the element into the encapsulated data and attributes. Each application 152 executing on web server 145 is able to dynamically define a new type of element for storage within storage system 104. The schema objects are stored in a configuration file that lives on every storage server 205 of storage cluster 150 and are retrieved by write master 202 as a function of the write request. Write master 202 builds a symbol table for each application that interfaces with storage system 104. The symbol table includes each schema object defined by applications 152 and, in one embodiment, is defined in Extensible Markup Language (XML).

Because computing system 102 may potentially store billions of files, partition master 200 attempts to ensure that the underlying file system for each storage server 204 is relatively balanced. More specifically, partition master 200 and write master 202 follow a naming convention that generates paths with the goal of ensuring that the directory structure does not become unbalanced and cause performance degradation.

Because data is replicated across storage server 204, the naming convention reserves the same number of internal storage volumes (drives) for each storage server 204. For example, in one embodiment, each storage server 204 has twenty-one storage volumes. In this configuration, a number of volumes, such as the first five, are reserved for storage of non-client data. The following table illustrates how in one embodiment the first five volumes are reserved:

TABLE 1

| Volume | Reason Reserved |
| --- | --- |
| A: | Floppy drive |
| B: | Floppy drive |
| C: | Boot partition (operating system) |
| D: | CD ROM |
| E: | Application partition |

Figure 8:
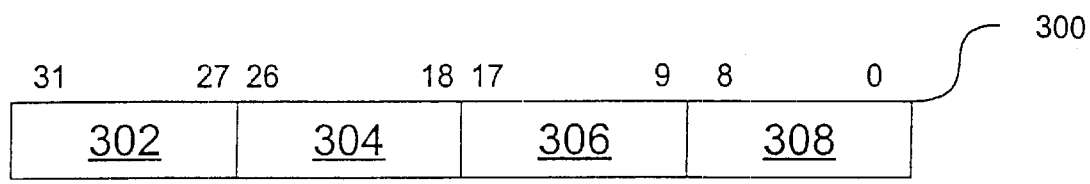
FIG. 8 illustrates one embodiment of a partition ID used by the storage system.

As described above, storage system 104 identifies each partition with a single partition ID. Each partition ID is maintained in a single data unit that, in one embodiment, is 32 bits in length. As illustrated in FIG. 8, in order to balance the directory structure, storage system 104 divides partition ID 300 into a plurality of bit regions. Bit region 302 is used to map the partition ID to an unreserved volume such as volumes f through z. Bit regions 304, 306 and 308 define first, second and third level directories, respectively.

In one embodiment, bit region 302 is five bits in length and, therefore, ranges in value from 0 to 31. This value may readily be converted to an alphanumeric character ranging from volume f to z. Bit regions 304 and 306 are nine bits in length. Each of these regions are converted to a directory name according to the following function:

$$\text{directory name Alpha}(R \bmod 26) + \text{Alpha} (((R/26) \bmod 26)) + \text{Alpha}(R)$$

where R represents the value of the bit region and Alpha returns a letter between 'A' and 'Z'. For example, if R equals 451 decimal, or 0x1C3 in hexadecimal, then the directory name equals 'D'+'D'+'01C3', i.e., 'DD01C3'.

Bit region 308 is also nine bits in length, but to ensure that a unique directory name is generated the following equation is used:

$$\text{directory name Alpha}(R \bmod 26) + \text{Alpha} (((R/26) \bmod 26)) + \text{Alpha (PID)}$$

where R represents the value of the bit region, Alpha returns a letter between 'A' and 'Z' and PID represents the entire value of partition ID 300. For example, if partition ID 300 equals 2,307,098,443 decimal, or 0x8983874B hexadecimal, then the directory name for bit region 308 equals 'T'+'M'+'8983874B', i.e., 'TM8983874B'. In this manner, using the above equations for a partition ID of 2,307,098,443 results in the complete path for the partition location of "R:\YD0011\DD01C3\TM8983874B".

Figure 9:
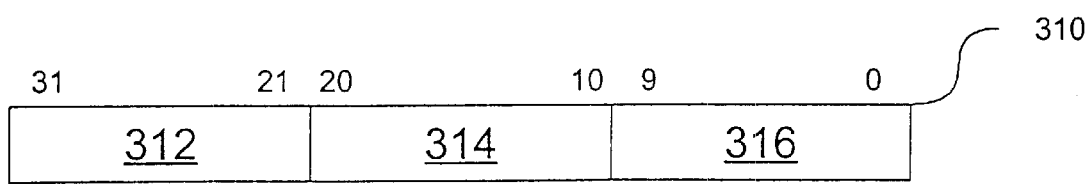
FIG. 9 illustrates one embodiment of an element ID used by the storage system.

The partition name that is generated is used as the path of the home directory for a corresponding client. Names for each element stored within the partition are generated in a similar manner. As described above, write master 202 assigns an element ID to each element that is to be stored in a given partition. FIG. 9, illustrates an element ID 310 that is divided into bit regions 312, 314, and 316. Bit regions 312 and 314 define additional directories that are generated using the first equation described above. Bit region 316 defines a particular element, such as a file, and is generated using the second equation described above. Therefore, the full path for a particular element is the home directory generated from the partition ID plus the additional directories and filename generated by bit regions 312, 314, and 316. For example, for a partition ID of 2,307,098,443 and an element ID of 0 (the first file written to that partition), the complete path for the element is "R:\YD0011\DD01C3\TM8983874B\AA0000\-AA0000\AA00000000.ifs".

In one embodiment the control logic necessary to implement partition master 200, write master 202, storage servers 204 and cluster backup 208, is implemented as a single software module, referred to as an Internet-scale File Store (IFS) service, that is operating in one of four corresponding modes. In one embodiment, each storage access module 160 of web servers 145 communicates with the IFS service via sockets. In this configuration, requests from web servers 145 are handled on a first port, such as 2000, while administrative requests are handled on a second port, such as 2001.

Storage manager 147 of storage system 104 displays a graphical user interface (GUI) such that an administrator is able to control and configure storage system 104. For example, using the GUI, the administrator is able to move partitions from one storage cluster 150 to another. In addition, storage monitor 148 continuously monitors storage system 104. In one embodiment, storage manager 147 and storage monitor 148 reside on a single server.

Storage monitor 148 communicates with the IFS service of each storage server 150 in order to monitor the performance and functionality of the corresponding storage server 150. More specifically, storage monitor 148 performs various checks on partition master 200, write master 202, cluster backup 208 and on each storage server 204. For example, storage monitor 148 may create a partition, write a file, read that file and then delete both the file and the partition—all in a sequence, all along tabulating the result and the time it took for each storage server 205 within storage clusters 150 to execute the task.

With storage manager 147 and storage monitor 148, storage system 104 is able to detect and self-correct most failures without requiring administrator interaction. Storage monitor 148 sends a message to storage manager 147 when a failure within one of the storage clusters 150 is detected. In response to the failure message, storage manager 147 promotes one of the storage servers 204 to perform the lost functionality. For example, if partition manager 200 has failed then storage manager 147 selects one of the storage servers 204 to act as a new partition master 200. Storage manager 147 commands the IFS service that is executing on the selected storage manager 147 to switch modes of operation. Similarly, if write master 202 or cluster backup 208 has failed then storage manager 147 selects one of the storage servers 204 and directs the IFS service to change modes of operation and perform the lost functionality.

In addition to the self-correcting operation described above, storage system 104 facilitates the fast addition of new storage servers and recovery of failed storage servers. More specifically, cluster backup 208 maintains multiple journals that log system transactions. Each journal spans a different length of time and includes different indexing schemes such that the shorter journals allow quicker access to more recent transactions. For example, in one embodiment, cluster backup 208 maintains a two-hour journal, a six-hour journal and a twenty-four hour journal.

When a storage server 204 fails, cluster backup 208 determines a time of failure and replays one of the journals in order to bring the failed storage server up to date. Once, the failed storage server 204 is nearly restored the entire storage cluster 150 enters a delayed-write mode, thereby blocking any new writes to storage cluster 150. These blocked writes are queued by storage access module 160 executing on web server 145 and are later resubmitted to storage system 104. During delayed-write mode, the remaining entries of the selected journal are processed such that the restored storage server 204 can be successfully added to storage 150 cluster. Once the storage server 204 is successfully operating, storage manager 147 directs storage cluster 150 to exit delayed-write mode and begin accepting write requests from storage access module 160. When a storage server 204 failed at a time that exceeds the length of the longest journal, storage manager 147 clears the failed storage server 204 and treats the failed storage server 204 as a new, uninitialized server as described below.

In order to add a new storage server 204, cluster backup 208 transfers all of the stored partitions to the new storage server 204. In one embodiment, cluster backup 208 transmits each of the elements stored within each partition. In addition, cluster backup 208 transmits any data structures, such as indexes, that are used to address the partitions, thereby saving the new storage server 204 from having to construct the data structures.

Once all of the partitions have been transferred, cluster backup 208 replays one of the journals based on the amount of time consumed during the data transfer. As described above, when the journal is nearly completely processed, the storage cluster 204 enters delayed-write mode such that the entire journal can be processed and the new storage server 204 can be inserted into storage cluster 150. In this manner, the new storage server 204 completely reflects the partitions stored on the other storage servers 204 upon initial execution.

Methods of an Exemplary Embodiment of the Invention

In the previous section, a system level overview of the operation of exemplary embodiments of the invention was described. In this section, the particular methods performed by the exemplary embodiments are described by reference to a flowchart. The methods to be performed by the embodiments constitute computer programs made up of computer-executable instructions. Describing the methods by reference to a flowchart enables one skilled in the art to develop such programs including such instructions to carry out the methods on suitable computing systems from computer-readable media.

Figure 10:
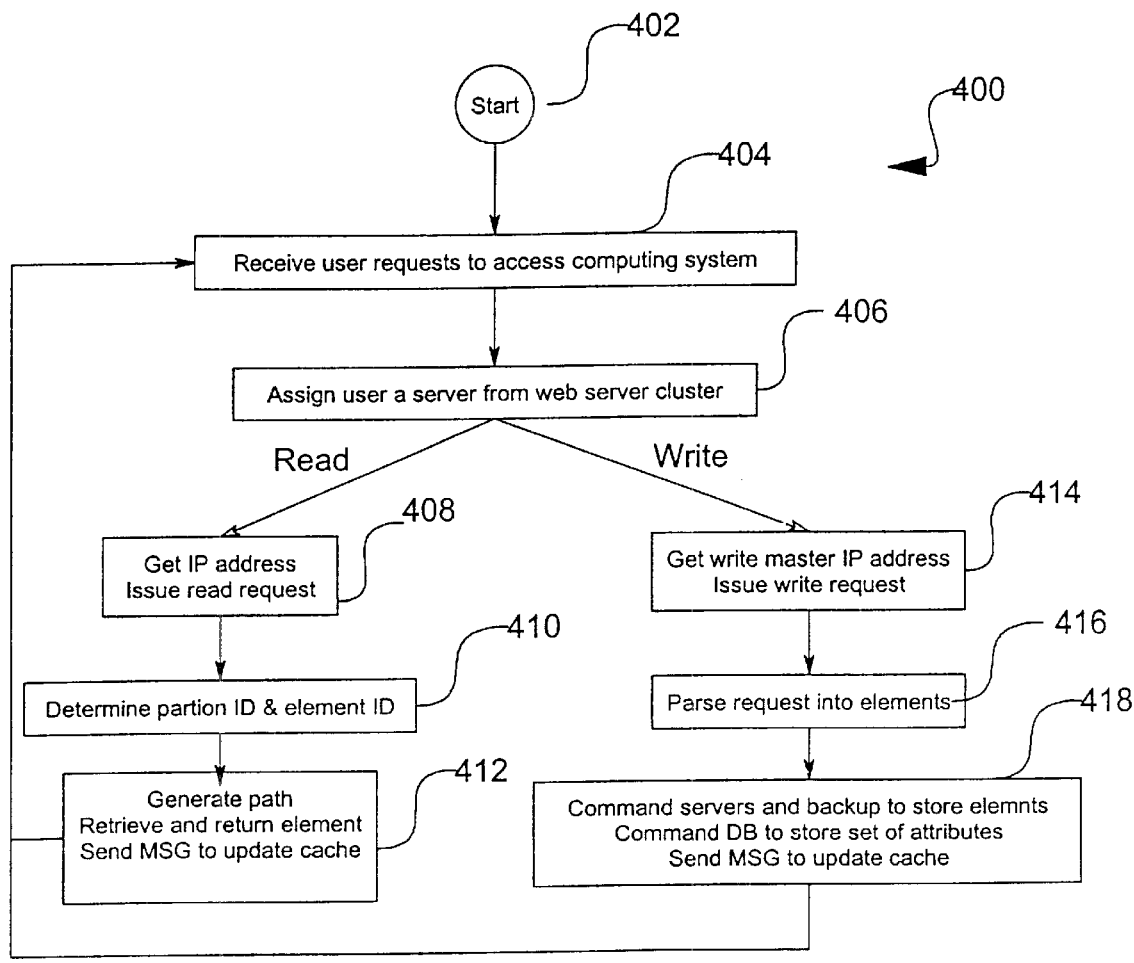
FIG. 10 is a flowchart illustrating one mode of operation of a computing system performing the inventive method.

FIG. 10 illustrates a flowchart of one exemplary method of operation of the above-described storage system. In order to meet the storage demands of thousands of Internet users 110, computing system 102 (FIG. 2) begins with block 402, immediately proceeds to block 404 and waits for users 110 to initiate a communication session. When a request is received, computing system 102 proceeds to block 406 and selects a web server 145 from web server cluster 142 to handle the current session.

When the communication session requires data to be read from storage system 104, as illustrated in block 408, storage access module 160 retrieves an IP for one of the storage servers 204. The IP address is retrieved from either the partition map cache 172 or from partition master 200. Using the IP address, the storage access module 160 issues a read request to the storage server 204.

In block 410, storage server 204 determines the partition ID and element ID that are necessary to satisfy the read request. For simple read requests, storage server 204 accesses one of the locally maintained indexes. For more complex read requests, storage server 204 queries database cluster 149 to identify the desired partition and element.

In block 412, storage server 204 generates the complete path for the desired partition and element based on the partition ID and the element ID. Based on the path, storage server 204 retrieves the corresponding element and returns the element to the requesting storage access module 160.

For write requests, as illustrated in block 414, storage access module 160 retrieves a corresponding IP address for write master 202 and communicates the write request to write master 202. In block 416, write master 202 parses the write requests into elements and assigns new elements a unique element ID. In block 418, write master 202 simultaneously commands each storage server 204 and cluster backup 208 to store the elements including both attributes and actual data. In addition, write master 202 communicates a set of the extracted attributes to database cluster 149.

The particular methods performed by storage system 104 have been described. The method performed by storage system 104 has been shown by reference to a flowchart including all the blocks from 402 through 416.

Conclusion

A highly scalable storage system that is capable of handling hundreds of millions of users and tens of billions of files has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that in one embodiment a plurality of clusters store data elements from a plurality of clients. A partition master assigns each client a unique partition within one of the clusters such that each data element of the client is stored in the partition assigned to the client. The data elements stored by each cluster, however, are replicated across one or more storage servers.

According to one aspect, the storage system includes a storage manager and a storage monitor and is able to detect and self-correct most failures without requiring administrator interaction. In one embodiment, the storage system includes a cluster backup that facilitates the addition of new storage servers, and the fast recovery of failed storage servers, by logging system transactions in multiple journals of different lengths. In another embodiment, the architecture includes a cluster of database servers, such as SQL servers, that provides complex queries to the client partitions.

According to another aspect, the storage system facilitates an extensible file store in that each storage element is defined by a corresponding schema object that is used to parse the element into the encapsulated data and attributes. In this manner, applications executing on the web servers are able to dynamically define a new type of element for storage within a storage system. Therefore, it is manifestly intended that this invention be limited only by the following claims and equivalents thereof.

We claim:

1. A storage system comprising:
   a plurality of clusters storing data elements from a plurality of clients, wherein each cluster comprises a plurality of storage servers;
   a storage monitor communicatively coupled to the clusters for detecting when one of the storage servers fails;
   a storage manager communicatively coupled to the storage monitor, wherein the storage monitor informs the storage manager when one of the storage servers fails; and a partition master communicatively coupled to the plurality of clusters to assign each client a storage partition within one of the clusters, wherein the storage manager commands one of the storage servers to operate as the partition master in the event that the partition master fails.

2. A storage system comprising:

a plurality of clusters storing data elements from a plurality of clients, wherein each cluster comprises a plurality of storage servers;

a storage monitor communicatively coupled to the clusters for detecting when one of the storage servers fails;

a storage manager communicatively coupled to the storage monitor, wherein the storage monitor informs the storage manager when one of the storage servers fails; and a write master included in each cluster to receive the data elements from the clients and to direct the storage servers to store the received data elements, wherein the storage manager commands one of the storage servers to operate as the write master in the event that the write master fails.

3. A storage system comprising:

a plurality of clusters storing data elements from a plurality of clients, wherein each cluster comprises a plurality of storage servers, and wherein the data elements are replicated on each of the plurality of storage servers in a given cluster;

a storage monitor communicatively coupled to the clusters for detecting when one of the storage servers fails;

a storage manager communicatively coupled to the storage monitor, wherein the storage monitor informs the storage manager when one of the storage servers fails; and wherein each cluster includes a cluster backup that records requests to store the data elements stored by the storage servers of the respective cluster.

4. The storage system of claim 3, wherein the cluster backup records the requests in one or more journals.

5. The storage system of claim 4, wherein each journal contains requests spanning over different lengths of time.

6. The storage system of claim 4, wherein when a failed server is detected the storage manager commands the cluster backup to replay at least one of the journals to restore the failed server.

7. The storage system of claim 4, wherein the cluster backup replays at least one of the journals in order to add a storage server to the cluster.

8. A computing method comprising:

receiving client requests to store data elements in a storage system having a plurality of storage clusters, wherein each storage cluster has a plurality of storage servers;

storing the data elements in each of the storage servers of one of the storage clusters, wherein storing the data elements includes assigning each client a storage partition within one of the clusters;

monitoring the storage servers to detect when a storage server fails; and promoting one of the storage servers to perform services of the failed storage server, wherein promoting one of the storage servers includes promoting one of the storage servers to assign each client a storage partition within one of the clusters.

9. A computing method comprising:

receiving client requests to store data elements in a storage system having a plurality of storage clusters, wherein each storage cluster has a plurality of storage servers, and wherein the data elements are replicated on each of the plurality of storage servers in a given storage cluster;

storing the data elements in each of the storage servers of one of the storage clusters;

monitoring the storage servers to detect when a storage server fails; and wherein receiving a client request includes recording the request in at least one journal.

10. The method of claim 9, wherein recording the request includes recording the request in a plurality of journals that each span a different length of time.

11. The method of claim 9, wherein monitoring the storage servers includes the step of replaying at least one of the journals to restore the failed server.

12. A computer-readable medium having computer-executable instructions for storing information in a storage system having error detection and recovery comprising:

receiving client requests to store data elements in a storage system having a plurality of storage clusters, wherein each storage cluster has a plurality of storage servers;

storing the data elements in each of the storage servers of one of the storage clusters, wherein storing the data elements includes assigning each client a storage partition within one of the clusters;

monitoring the storage servers to detect when a storage server fails; and promoting one of the storage servers to perform services of the failed storage server, wherein promoting one of the storage servers includes promoting one of the storage servers to assign each client a storage partition within one of the clusters.

13. A computer-readable medium having computer-executable instructions for storing information in a storage system having error detection and recovery comprising:

receiving client requests to store data elements in a storage system having a plurality of storage clusters, wherein each storage cluster has a plurality of storage servers, and wherein the data elements are replicated on each of the plurality of storage servers in a given storage cluster;

storing the data elements in each of the storage servers of one of the storage clusters;

monitoring the storage servers to detect when a storage server fails; and wherein receiving a client request includes recording the request in at least one journal.

* * * * *

UNITED STATES PATENT AND TRADEMARK OFFICE
CERTIFICATE OF CORRECTION

PATENT NO.   : 6,523,130 B1
DATED        : February 18, 2003
INVENTOR(S)  : R.C. Hickman et al.

It is certified that error appears in the above-identified patent and that said Letters Patent is hereby corrected as shown below:

Column 1,
Line 29, "in the drawing" should read -- in the drawings --
Line 39, "technologies including" should read -- technologies, including --

Column 2,
Line 28, "Windows©" should read -- Windows® --
Line 30, "API, (ISAPI) that" should read -- API (ISAPI), that --

Column 3,
Line 15, "hereof and, which" should read -- hereof, and --
Line 16, "illustration, specific" should read -- illustration specific --
Line 29, "that is" should read -- that are --

Column 4,
Line 5, "CD ROM" should read -- CD-ROM --
Line 42, "communication device" should read -- communications device --

Column 5,
Line 41, "computing system may" should read -- computing system 102 may --
Line 65, "can also easily scale" should read -- can also be easily scaled --

Column 6,
Line 27, "(DDL's)" should read -- (DDLs) --

Column 7,
Line 15, "web-services 145" should read -- web servers 145 --
Line 42, "stand point" should read -- standpoint --
Line 44, "Ids" should read -- IDs --

Column 8,
Line 36, "as well as the" should read -- as well as to the --

Column 9,
Line 9, "CD ROM" should read -- CD-ROM --
Line 25, "volume f to z." should read -- volumes f to z. --
Line 26, "regions are" should read -- regions is --
Lines 30 and 41, "directory name Alpha" should read -- directory name = Alpha --

UNITED STATES PATENT AND TRADEMARK OFFICE
CERTIFICATE OF CORRECTION

PATENT NO. : 6,523,130 B1
DATED : February 18, 2003
INVENTOR(S) : R.C. Hickman et al.

It is certified that error appears in the above-identified patent and that said Letters Patent is hereby corrected as shown below:

Column 9 (cont'd),
Line 34, "0x1C3" should read -- 0x1C3, --
Line 37, "name is generated" should read -- name is generated, --
Line 58, "FIG. 9, illustrates" should read -- FIG. 9 illustrates --

Column 10,
Lines 41 and 46, "failed then" should read -- failed, then --
Line 61, "Once," should read -- Once --
Line 62, "is nearly restored" should read -- is nearly restored, --

Column 11,
Line 3, "storage 150 cluster." should read -- storage cluster 150. --

Column 12,
Line 11, "elements including" should read -- elements, including --

Signed and Sealed this

Twelfth Day of August, 2003

JAMES E. ROGAN
*Director of the United States Patent and Trademark Office*